United States Patent
Agrawal et al.

(10) Patent No.: US 6,278,977 B1
(45) Date of Patent: Aug. 21, 2001

(54) DERIVING PROCESS MODELS FOR WORKFLOW MANAGEMENT SYSTEMS FROM AUDIT TRAILS

(75) Inventors: Rakesh Agrawal, San Jose, CA (US); Frank Leymann, Aidlingen; Dieter Roller, Schonaich, both of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/127,448

(22) Filed: Jul. 31, 1998

(30) Foreign Application Priority Data

Aug. 1, 1997 (EP) .................................................. 97113299

(51) Int. Cl.$^7$ .................................................. G06F 17/60
(52) U.S. Cl. .............................................................. 705/7
(58) Field of Search .................................. 707/1, 10, 100, 707/103, 104; 705/1, 7, 8; 700/95, 100, 99, 104; 706/925, 926

(56) References Cited

U.S. PATENT DOCUMENTS

| | | | |
|---|---|---|---|
| 5,093,794 | * 3/1992 | Howie et al. .......................... | 700/100 |
| 5,233,533 | * 8/1993 | Edstrom et al. ....................... | 700/103 |
| 5,249,300 | 9/1993 | Bachman et al. ..................... | 707/104 |
| 5,408,663 | * 4/1995 | Miller .................................... | 709/104 |
| 5,524,241 | * 6/1996 | Ghoneimy et al. .................... | 707/10 |
| 5,581,691 | 12/1996 | Hsu et al. .............................. | 714/15 |
| 5,630,069 | * 5/1997 | Flores et al. .......................... | 705/7 |
| 5,826,236 | * 10/1998 | Narimatsu et al. ..................... | 705/8 |
| 5,890,133 | * 3/1999 | Ernst ..................................... | 705/7 |
| 5,958,071 | * 9/1999 | Iida et al. .............................. | 714/17 |
| 6,014,673 | * 1/2000 | Davis et al. ........................... | 707/202 |
| 6,041,306 | * 3/2000 | Du et al. ................................ | 705/8 |
| 6,061,506 | * 5/2000 | Wollaston et al. ..................... | 703/23 |
| 6,070,144 | * 5/2000 | Ginsberg et al. ....................... | 705/9 |

FOREIGN PATENT DOCUMENTS 0 254 825    2/1988    (EP) ............................. G03F/17/60

OTHER PUBLICATIONS

Bradley P. et al., "Business process re-engineering (BPR)—A study of the software tools currently available", Computers In Industry, NL, Elsevier Science Publishers, vol. 25, No. 3, Mar. 1995, pp. 309–330.

Inniss, H.A. et al. (1994) "Workflow Management Based on an Object-Oriented Pradigm", IBM Technical Disclosure Bulletin, vol. 37, No. 03, p. 185.

Leymann, F. et al. (1994) "Managing Business Processes as an Information Resource", IBM Systems Journal, vol. 33:2, pp. 326–348.

Leymann, F. "A Meta Model to Support Modeling and Execution of Processes", pp. 287–294.

Leymann, F. et al. (1994) "Business Process Management with FlowMark", IEEE, pp. 230–234.

(List continued on next page.)

Primary Examiner—Tariq R. Hafiz
Assistant Examiner—Leslie K. Nguyen
(74) Attorney, Agent, or Firm—Scully, Scott, Murphy & Presser; Gail Zarick, Esq.

(57) ABSTRACT

The present invention relates to the area of workflow management systems (WFMS). More particularly the invention is related to a methodology of automatically deriving and steadily improving a process model executed by the WFMS. The current invention dramatically simplifies and automates the process of model a business model of a business process. The invention allows to start just with set of unrelated activities and discover the real world relations between them at a later point in time; data mining and OLAP technologies are exploited for this discovery. The current invention thus proposes a posteriori methodology. For that purpose the precise underlying process model is derived at a later point in time based on audit data collected by the WFMS during the early deployment of a process model.

8 Claims, 3 Drawing Sheets

OTHER PUBLICATIONS

Marchak, R. "IBM's FlowMark: Object–Oriented Workflow for Mission–Critical Applications", pp. 1–13.

Spohn, D.J. (1990) "Project Management Environment", IBM Technical Disclosure Bulletin, vol. 32, No. 9A, pp. 250–254.

(1994) "IBM FlowMark for OS/2: Model Efficiency Into Your Business", IBM Software Solutions, Second Edition, pp. 1–3.

Anderson, David R. et al., "An Introduction to Management Science: Quantitative Approaches to Decision Making, Third Edition," West Publishing Company 1976. see Chapter 9.*

Kappel, G. et al., "TriGS–flow: Active Object–Oriented Workflow Management." Proceedings of the 28th Annual Hawaii International Conference on System Sciences 1995.*

Hollingsworth, David. "Workflow Management Coalition: The Workflow Reference Model." Jan. 15, 1995.*

* cited by examiner

FIG. 1

| Process Name | Process Instance | Activity | Execution* Interval |
|---|---|---|---|
| P | P1 | A | 1, 2 |
| P | P1 | B | 3, 7 |
| P | P1 | C | 4, 5 |
| P | P1 | D | 8, 9 |
| P | P2 | A | 1, 3 |
| P | P2 | B | 5, 6 |
| P | P2 | C | 4, 6 |
| P | P2 | D | 7, 8 |
| P | P3 | A | 1, 3 |
| P | P3 | B | 4, 5 |
| P | P3 | C | 5, 6 |
| P | P3 | D | 7, 8 |
| P | P4 | A | 2, 3 |
| P | P4 | B | 4, 6 |
| P | P4 | C | 5, 6 |
| P | P4 | D | 7, 9 |

FIG. 2

| Process Name | Process Instance | Precedence Relation |
|---|---|---|
| P | P1 | A → {B, C}<br>{B, C} → D |
| P | P2 | A → {B, C}<br>{B, C} → D |
| P | P3 | A → B<br>A → C<br>B → D<br>B → D |
| P | P4 | A → {B, C}<br>{B, C} → D |

DERIVING PROCESS MODELS FOR WORKFLOW MANAGEMENT SYSTEMS FROM AUDIT TRAILS

BACKGROUND OF THE INVENTION

1. Technical Field

The present invention relates to the field of computer systems acting as workflow management systems (WFMS).

2. Prior Art

A new area of technology with increasing importance is the domain of Workflow-Management-Systems (WFMS). WFMS support the modelling and execution of business processes. Business processes control which piece of work of a network of pieces of work will be performed by whom and which resources are exploited for this work, i.e. a business process describes how an enterprise will achieve its business goals. The individual pieces of work might be distributed across a multitude of different computer systems connected by some type of network.

The process of designing, developing and manufacturing a new product and the process of changing or adapting an existing product presents many challenges to product managers and engineers to bring the product to market for the least cost and within schedule while maintaining or even increasing product quality. Many companies are realizing that the conventional product design process is not satisfactory to meet these needs. They require early involvement of manufacturing engineering, cost engineering, logistic planning, procurement, manufacturing, service and support with the design effort. Furthermore, they require planning and control of product data through design, release, and manufacturing.

The correct and efficient execution of business processes within a company, e.g. development or production processes, is of enormous importance for a company and has significant influence on a company's overall success in the market place. Therefore, those processes have to be regarded similar to technology processes and have to be tested, optimized and monitored. The management of such processes is usually performed and supported by a computer based process or workflow management system.

In D. J. Spoon: "Project Management Environment", IBM Technical Disclosure Bulletin, Vol. 32, No. 9A, Feb. 1990, pages 250 to 254, a process management environment is described including an operating environment, data elements, and application functions and processes.

In R. T. Marshak: "IBM's FlowMark, Object-Oriented Workflow for Mission-Critical Applications", Workgroup Computing Report (USA), Vol. 17, No. 5, 1994, page 3 to 13, the object character of IBM FlowMark as a client/server product built on a true object model that is targeted for mission-critical production process application development and deployment is described.

In H. A. Inniss and J. H. Sheridan: "Workflow Management Based on an Object-Oriented Paradigm", IBM Technical Disclosure Bulletin, Vol. 37, No. 3, March 1994, page 185, other aspects of object-oriented modelling on customization and changes are described.

In F. Leymann and D. Roller: "Business Process Management with FlowMark", Digest of papers, Cat. No. 94CH3414-0, Spring COMPCON 94, 1994, pages 230 to 234, the state-of-the-art computer process management tool IBM FlowMark is described. The meta model of IBM FlowMark is presented as well as the implementation of IBM FlowMark. The possibilities of IBM FlowMark for modelling of business processes as well as their execution are discussed. The product IBM FlowMark is available for different computer platforms and documentation for IBM FlowMark is available in every IBM branch.

In F. Leymann: "A meta model to support the modelling and execution of processes", Proceedings of the 11th European Meeting on Cybernetics and System Research EMCR92, Vienna, Austria, April 21 to 24, 1992, World Scientific 1992, pages 287 to 294, a meta model for controlling business processes is presented and discussed in detail.

The "IBM FlowMark for OS/2", document number GH 19-8215-01, IBM Corporation, 1994, available in every IBM sales office, represents a typical modern, sophisticated, and powerful workflow management system. It supports the modelling of business processes as a network of activities; refer for instance to "Modeling Workflow", document number SH 19-8241, IBM Corporation, 1996. This network of activities, the process model, is constructed as a directed, acyclic, weighted, colored graph. The nodes of the graph represent the activities or work items which are performed. The edges of the graph, the control connectors, describe the potential sequence of execution of the activities. Definition of the process graph is via the IBM FlowMark Definition Language (FDL) or the built-in graphical editor. The runtime component of the workflow manager interprets the process graph and distributes the execution of activities to the right person at the right place, e.g. by assigning tasks to a work list according to the respective person, wherein said work list is stored as digital data within said workflow or process management computer system.

In F. Leymann and W. Altenhuber: "Managing business processes as an information resource", IBM Systems Journal, Vol. 32 (2), 1994, the mathematical theory underlying the IBM FlowMark product is described.

In D. Roller: "Verifikation von Workflows in IBM FlowMark", in J. Becker und G. Vossen (Hrsg.): "Geschaeftsprozessmodellierung und Workflows", International Thompson Publishing, 1995, the requirement and possibility of the verification of workflows is described. Furthermore the feature of graphical animation for verification of the process logic is presented as it is implemented within the IBM FlowMark product.

For implementing a computer based process management system, firstly the business processes have to be analyzed and, as the result of this analysis, a process model has to be constructed as a network of activities corresponding to the business process. In the IBM FlowMark product, the process models are not transformed into an executable. At run time, an instance of the process is created from the process model, called a process instance. This process instance is then interpreted dynamically by the IBM FlowMark product.

Another area of the technology relates to data mining technology. Data mining technology allows to automatically detect patterns in huge amounts of data. Especially, it is not based on iteratively verifying hypothesises about potential patterns within the data (which is intractable, in general) but it is deriving such patterns based on much more efficient analysis algorithms.

OLAP (OnLine Analytical Processing) tools allow the fast access to large amounts of data, many different representations and aggregations of the same results sets, and the access of data related to already derived results. While this is in theory true for standard relational DBMSs new technologies like multi-dimensional hypercubes or time-series allow this in a very efficient way.

So far no approach has been made to exploit data mining and OLAP technologies for WFMS.

Moreover the various tasks and activities being part of a business process have been developed independently and do not know of their mutual existence. Very often it depends on the knowledge of the users of these pieces of software in which sequence and under which conditions the individual activities have to be executed. One goal of business reengineering is to determine the models of existing business processes. The business processes are quite often only known by the people working on the various pieces of the business processes, i.e. various people have "local knowledge" of the business processes they are working on. Thus often there is no single person in an enterprise who knows the global interdependence and sequence of execution of the individual pieces. Different business reengineering methodologies are used today to capture this local knowledge and to derive the "global model" of the overall business process out of it. But in essence all these approaches actually only help to collect the global business process information and help to represent the information in certain ways. Finally all that information has to be gathered by interviews from the users of these software pieces.

The derivation of process models is typically addressed by business reengineering tools through support of a graphical user interface for collecting process information and drawing graphical representations of process models. It is the responsibility of the tool user to obtain all the information to come up with the process model.

In many situations process information is not complete, if available at all. The quality of the deduced process model is highly dependent on the quality of the data supplied by the people. Often, this turns out to be an obstruction of the successful deployment of workflow technology or of its deployment at all.

The inherent problem is that current methodologies of business reengineering are a priori in nature, i.e. it is assumed that the correct process model of a business process to be supported must be specified before workflow technology can be used.

The present invention is therefore based on the objective to improve the method of defining process models for workflow management systems.

SUMMARY OF THE INVENTION

The present invention teaches a computerized method automatically adapting a process model. Said process model may be a model of a business process. Such process models are used, for instance, within computer systems for controlling and executing the underlying business process. It may comprise a multitude of activities being part of said business process. A process model defines all possible allowed sequences of activities of said business-process. The proposed method of adapting is characterized by a pattern collection step. The pattern collection step is based on a current process model. During said pattern collection step each activity of the current process model which is executed is recorded within an audit trail by audit trail records. Such an audit trail record, encompasses a process model instance identification of the process model instance within said activity that is being executed. In addition said audit trail record encompasses an activity identification of the activity being executed. Moreover said audit trail record encompasses the execution interval of said activity comprising a starting time and a termination time of said activity being executed. The proposed method of adapting is further characterized by a pattern analysis step which analyzes, after a predefined sampling period, said audit trail records and which generates a next process model by a first and a second step. In the first step the method determines, based on the current-process-model, those activities within the audit trail records having identical process model instance identifications which are processed sequentially and those activities which are processed in parallel. Activities executed sequentially are recorded with non-overlapping execution-intervals, and activities, which are processed in parallel, are recorded with overlapping execution-intervals. In the second step the method uses the current process model to generate a next process model by re-ordering those activities, allowed to be processed in parallel according to the current process model but actually have been executed sequentially only, as determined in said first step, into sequential execution order based on the time order of said execution intervals.

The technique proposed by the present invention opens a new type of approach for defining a process model. The current approaches to define a process model are 'a priori' approaches, which means that a process model has to be defined externally and has to model a business process completely and perfectly. The existence of such a process model is the prerequisite for its execution. The current approach in contrast is an 'a posteriori' approach, which means that it is possible to start already with a rough approximation of a process model and the proposed method is able to permanently improve the process model. In an evolutionary process the correct process model will be determined by the proposed method.

Typically the various tasks and activities being part of a business process have been developed independently and do not know of their mutual existence. Very often it depends on the knowledge of the users of these pieces of software in which sequence and under which conditions the individual activities have to executed. The business processes are quite often only known by the people working on the various pieces of the business processes, i.e. various people have "local knowledge" of the business processes they are working on. Thus often there is no single person in an enterprise knowing the global interdependence and sequence of execution of the individual pieces. In such case, the proposed methodology nevertheless will determine the correct process model.

In many situations process information required to define in an 'a priori' approach is not complete, if available at all. The quality of the deduced process model is highly dependent on the quality of the data supplied by the people. Often, this turns out to be an obstruction of the successful deployment of workflow technology or of its deployment at all. Due to the evolutionary approach of the current teaching incomplete business process information is no longer an obstacle.

As the present invention proposes a posteriori methodology deriving the precise underlying process model at a later point in time based on audit data collected during the deployment of the process model finally high quality models for the business processes will be achieved. Moreover even if the underlying business process has to change, for instance due to reasons inherent to the business itself and not related to its computer representation, the present invention will be able to adapt the process model to these changes.

Additionally, the computerized method of automatically adapting a process model is repeated permanently by using said next process model (generated by the previous iteration) as the current process model, being the basis for a repeated iteration of the methodology. Such an approach provides the full flexibility of the current teaching. Based on this teaching, the methodology may be repeated permanently this will guarantee to finally generate the authentic representation of the business process as a process model. Also due to this strategy the current teaching will also be able to adapt a process model if the actual business process has changed due to external reasons.

The present invention may further comprise a pattern analysis step which never re-orders two activities in a sequential execution order if said two activities have been determined at least once as being processed in parallel. The advantages of this approach is that the current teaching becomes stable against accidental serial execution of activities. Any serialization within a process model represents a further restriction of the process model. This allows the current teaching to distinguish sequential execution of activities due to random influences from sequential execution of activities due to the inherent nature of the business process.

Still further, the process model and said next process model of the present invention may be managed and executed by a Workflow-Management-System (WFMS). Accordingly, the complete capabilities of the current teaching is made available to WFMS.

It is further noted that the pattern collection step of the present invention may be executed by said WFMS. Accordingly, the capabilities, which are already available within a WFMS, are exploited for the current method of automatically adapting a process model.

The present invention is further directed to a computerized method which adapts a process-model wherein said repeated application starts with an initial-current-process-model which allows for parallel execution of all activities within said initial-current-process-model. Thus the present invention may start with a very simple initial current process model, consisting of the unrelated collection of activities not imposing any initial precedence between the individual activities. Moreover this initial current process model, due to its generality and simplicity, can also be generated automatically.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

The present invention is illustrated based on IBM's Flow-Mark workflow management system. Of course any other WFMS could be used instead. Furthermore the current teaching applies also to any other type of system which offers WFMS functionalities not as a separate WFMS but within some other type of system.

It has to be stressed especially that using a WFMS for producing the audit log for applying OLAP or data mining technology is not vital for the current invention. Other techniques like an appropriate wrappering or instrumentalization of existing applications might me used for generating the required log records. But using a WFMS for this purpose is convenient in many situations. Thus, without limiting the scope of the current invention, the exploitation of a WFMS for what follows is assumed.

The following is a short outline on the basic concepts of a workflow management system based on IBM's FlowMark WFMS:

From an enterprise point of view, the management of business processes is becoming increasingly important: business processes or process for short control which piece of work will be performed by whom and which resources are exploited for this work, i.e. a business process describes how an enterprise will achieve its business goals. A WFMS may support both, the modeling of business processes and their execution.

Modeling of a business process as a syntactical unit in a way that is directly supported by a software system is extremely desirable. Moreover, the software system can also work as an interpreter basically getting as input such a model. The model, called a process model or workflow model, can then be instantiated and the individual sequence of work steps depending on the context of the instantiation of the model can be determined. Such a model of a business process can be perceived as a template for a class of similar processes performed within an enterprise; it is a schema describing all possible execution variants of a particular kind of business process. An instance of such a model and its interpretation represents an individual process, i.e. a concrete, context dependent execution of a variant prescribed by the model. A WFMSs facilitates the management of business processes. It provides a means to describe models of business processes (build time) and it drives business processes based on an associated model (run time). The meta model of IBM's WFMS FlowMark, i.e. the syntactical elements provided for describing business process models, and the meaning and interpretation of these syntactical elements, is described next.

A process model is a complete representation of a process, comprising a process diagram and the settings that define the logic behind the components of the diagram. Using various services provided by FlowMark these buildtime definitions the process models are then converted into process templates for use by FlowMark at runtime. Important components of a FlowMark process model are:

Processes
Activities
Blocks
Control Flows
Connectors
Data Containers
Data Structures
Conditions
Programs
Staff Not all of these elements will be described below.

On this background a process, modeled by a process model within FlowMark, is a sequence of activities that must be completed to accomplish a task. The process is the top-level element of a FlowMark workflow model. In a FlowMark process, it can be defined:

How work is to progress from one activity to the next

Which persons are to perform activities and what programs they are to use

Whether any other processes, called subprocesses, are nested in the process

Of course multiple instances of a FlowMark process can run in parallel.

Activities are the fundamental elements of the meta model. An activity represents a business action that is from a certain perspective a semantical entity of its own. With the model of the business process it might have a fine-structure that is then represented in turn via a model, or the details of it are not of interest at all from a business process modeling point of view. Refinement of activities via process models allows for both, modeling business processes bottom-up and top-down. An activity being a step within a process, represents a piece of work that the assigned person can complete by starting a program or another process. In a process model, the following information is associated with each activity:

What conditions must be met before the activity can start

Whether the activity must be started manually by a user or can start automatically What condition indicates that the activity is complete Whether control can exit from the activity automatically or the activity must first be confirmed as complete by a user How much time is allowed for completion of the activity Who is responsible for completing the activity Which program or process is used to complete the activity What data is required as input to the activity and as output from it A FlowMark process model consists of the following types of activities:

Program activity:

Has a program assigned to perform it. The program is invoked when the activity is started. In a fully automated workflow, the program performs the activity without human intervention. Otherwise, the user must start the activity by selecting it from a runtime work list. Output from the program can be used in the exit condition for the program activity and for the transition conditions to other activities.

Process activity:

Has a (sub-)process assigned to perform it. The process is invoked when the activity is started. A process activity represents a way to reuse a set of activities that are common to different processes. Output from the process, can be used in the exit condition for the process activity and for the transition conditions to other activities.

The flow of control, i.e. the control flow through a running process determines the sequence in which activities are executed. The FlowMark workflow manager navigates a path through the process that is determined by the evaluation to true of start conditions, exit conditions, and transition conditions.

The results that are in general produced by the work represented by an activity is put into an output container, which is associated with each activity. Since an activity will in general require to access output containers of other activities, each activity is associated in addition with an input container too. At run time, the actual values for the formal parameters building the input container of an activity represent the actual context of an instance of the activity. Each data container is defined by a data structure. A data structure is an ordered list of variables, called members, that have a name and a data type. Data connectors represent the transfer of data from output containers to input containers. When a data connector joins an output container with an input container, and the data structures of the two containers match exactly, the FlowMark workflow manager maps the data automatically.

Connectors link activities in a process model. Using connectors, one defines the sequence of activities and the transmission of data between activities. Since activities might not be executed arbitrarily they are bound together via control connectors. A control connector might be perceived as a directed edge between two activities; the activity at the connector's end point cannot start before the activity at the start point of the connector has finished (successfully). Control connectors model thus the potential flow of control within a business process model. Default connectors specify where control should flow when the transition condition of no other control connector leaving an activity evaluates to true. Default connectors enable the workflow model to cope with exceptional events. Data connector specify the flow of data in a workflow model. A data connector originates from an activity or a block, and has an activity or a block as its target. One can specify that output data is to go to one target or to multiple targets. A target can have more than one incoming data connector.

Conditions are the means by which it is possible to specify the flow of control in a process. In FlowMark process models logical expressions can be defined that are evaluated by FlowMark at runtime to determine when an activity may start, end, and pass control to the next activity. Start conditions are conditions that determine when an activity with incoming control connectors can start. The start condition may specify that all incoming control connectors must evaluate to true, or it may specify that at least one of them must evaluate to true. Whatever the start condition, all incoming connectors must be evaluated before the activity can start. If an activity has no incoming control connectors, it becomes ready when the process or block containing it starts. In addition, a Boolean expression called transition condition is associated with each control connector. Parameters from output containers of activities having already produced their results are followed as parameters referenced in transition conditions. When at run time an activity terminates successfully all control connectors leaving this activity are determined and the truth value of the associated transition conditions is computed based on the actual values of their parameters. Only the end points of control connectors the transition conditions of which evaluated to TRUE are considered as activities that might be executed based on the actual context of the business process. Transition conditions model thus the context dependent actual flow of control within a business process (i.e. an instance of a model). Business processes encompass long running activities in general; such an activity need to be allowed to become interrupted. Thus, termination of an activity does not necessarily indicate that the associated task has been finished successfully. In order to allow the measurement of successfullness of the work performed by an activity a Boolean expression called exit condition is associated with each activity. Exactly the activities the exit condition of which evaluated to true in the actual context are treated as successfully terminated. For determination of the actual control flow precisely the successfully terminated activities are considered. Thus the logical expression of an exit condition, if specified, must evaluate to true for control to pass from an activity or block.

Beside describing the potential flow of control and data between activities a business process model also encompasses the description of the flow of the activities itself between "resources" actually performing the pieces of work represented by each activity. A resource may be specified as a particular program, person, a role, or an organizational unit. At run time tasks are resolved into requests to particular persons to perform particular activities resulting in work items for that person. Staff assignments are the means to distribute activities to the right people in the sequence prescribed by the control flow aspect of a business process model. Each activity in a process is assigned to one or more staff members defined in the FlowMark database. Whether an activity is started manually by the user or automatically by the FlowMark workflow manager, and whether it requires user interaction to complete or completes automatically, a staff member must be assigned to it. FlowMark staff definition entails more than identifying people at your enterprise to the FlowMark database. For each person defined, you can specify a level, an organization, and multiple roles. These attributes can be used at run time to dynamically assign activities to people with suitable attributes.

Process definition includes modeling of activities, control connectors between the activities, input/output container, and data connectors. A process is represented as a directed acyclic graph with the activities as nodes and the control/data connectors as the edges of the graph. The graph is manipulated via a built-in, event-driven, CUA compliant graphic editor. The data containers are specified as named data structures. These data structures themselves are specified via the DataStructureDefinition facility. FlowMark distinguishes three main types of activities: program activities, process activities, and blocks. Program activities are implemented through programs. The programs are registered via the Program Definition facility. Blocks contain the same constructs as processes, such as activities, control connectors etc. They are however not named and have their own exit condition. If the exit condition is not met, the block is started again. The block thus implements a Do Until construct. Process activities are implemented as processes. These subprocesses are defined separately as regular, named processes with all its usual properties. Process activities offer great flexibility for process definition. It not only allows to construct a process through permanent refinement of activities into program and process activities (top-down), but also to build a process out of a set of existing processes (bottom-up). In particular, process activities help to organize the modeling work if several process modeler are working together. It allows the team members to work independently on different activities. Program and process activities can be associated with a time limit. The time limit specifies how long the activity may take. If the time is exceeded, a designated person is notified. If this person does not react within another time limit, the process administrator is notified. It not only helps to recognize critical situation but also to detect process deficiencies as all notifications are recorded in an audit trail.

All data structures used as templates for the containers of activities and processes are defined via the Data Structure Definition Facility. Data Structures are names and are defined in terms of elementary data types, such as float, integer, or string and references to existing data structures. Managing data structures as separate entities has the advantage that all interfaces of activities and their implementations are managed consistently in one place (similar to header files in programming languages).

All programs which implement program activities are defined via the Program Registration Facility. Registered for each program is the name of the program, its location, and the invocation string. The invocation string consists of the program name and the command string passed to the program.

Before process instances can be created, the process model must be translated to ensure the correctness and completeness of the process model. The translated version of the model is used as a template when a process instance is created. This allows to make changes to the process model without affecting executing process instances. A process instance is started either via the graphical interface of via the callable process application programming interface. When a process is started, the start activities are located, the proper people are determined, and the activities are posted onto the work list of the selected people. If a user selects the activity, the activity is executed and removed from the work list of any other user to whom the activity has been posted. After an activity has executed, its exit condition is evaluated. If not met, the activity is rescheduled for execution, otherwise all outgoing control connectors and the associated transition conditions are evaluated. A control connector is selected, if the condition evaluates to TRUE. The target activities of the selected control connectors are then evaluated. If their start conditions are true, they are posted to the work list of selected people. A process is considered terminated, if all end activities have completed. To make sure that all end activities finish, a dead path elimination is performed. It removes all edges in the process graph which can never be reached due to failing transition conditions. All information about the current state of a process is stored in the database maintained by the server. This allows for forward recovery in the case of crashes.

The present invention is addresses the problem of modeling business processes. Various tools exist to support the specification of models of business processes, for example business reengineering tools or modeling components of workflow management systems (WFMS). Once having imported the model of a business process into a WFMS it can be instantiated and enacted by the WFMS to guide users in correctly performing their business tasks. In general, it is assumed that the undertaking of deriving such a model produces a description of all the relations between all the business tasks (or called activities in the area of WFMS) encompassed in the subject business process. In this term 'relations between all business tasks' means the precedence relation between the tasks, or in other words the predecessor/successor relationship or the potential execution sequences of the tasks. The present invention dramatically simplifies and automates the process of modeling a business model of a business process. The present invention allows to start just with the set of unrelated activities and discover the real world relations between them at a later point in time; data mining and OLAP technologies are exploited for this discovery.

Typically the various tasks and activities being part of a business process have been developed independently and do not know of their mutual existence. Very often it depends on the knowledge of the users of these pieces of software in which sequence and under which conditions the individual activities have to executed. One goal of business reengineering is to determine the models of existing business processes. The business processes are quite often only known by the people working on the various pieces of the business processes, i.e. various people have "local knowledge" of the business processes they are working on. Thus often there is no single person in an enterprise knowing the global interdependence and sequence of execution of the individual pieces. Different business reengineering methodologies are used today to capture this local knowledge and to derive the "global model" of the overall business process out of it. But in essence all of these approaches actually only help to collect the global business process information and help to represent the information in certain ways. Finally all that information has to be gathered by interviews from the users of these software pieces.

The derivation of process models is typically addressed by business reengineering tools through support of a graphical user interface for collecting process information and drawing graphical representations of process models. It is the responsibility of the tool user to obtain all the information to come up with the process model.

In many situations process information is not complete, if available at all. The quality of the deduced process model is highly dependent on the quality of the data supplied by the people. Often, this turns out to be an obstruction of the successful deployment of workflow technology or of its deployment at all.

The inherent problem is that current methodologies of business reengineering are a priori in nature, i.e. it is assumed that the correct process model of a business process to be supported must be specified before workflow technology can be used.

The present invention proposes a posteriori methodology that does not make this assumption, i.e. it allows to support a business process from the very beginning by workflow technology and to derive the precise underlying process model at a later point in time based on audit data collected by the WFMS during the early deployment. Especially, this will help to come up with high quality models for the business processes to be supported.

Data mining technology allows to automatically detect patterns in huge amounts of data. Especially, it is not based on iteratively verifying hypothesises about potential patterns within the data (which is intractable, in general) but it is deriving such patterns based on much more efficient analysis algorithms.

OLAP (OnLine Analytical Processing) tools allow the fast access to large amounts of data, many different representations and aggregations of the same results sets, and the access of data related to already derived results. While this is in theory true for standard relational DBMSs new technologies like multi-dimensional hypercubes or time-series allow this in a very efficient way.

In general, a WFMS writes for each significant workflow event a log record into an audit trail. Especially, the event that a particular activity has been started or terminated and at what time is logged in this audit trail. In addition, these events are associated with the instance of the process model they are supporting, Consequently, the sequence of execution of the activities of a process model are available in the audit log of a WFMS on a per instance base. Data mining technology can thus be used to determine patterns of execution sequences of activities of business processes from audit trails.

From a global perspective the present invention suggests a method of evolutionary discovering and adapting a process model of a business process. The methodology is based on an approach in which the WFMS automatically is tracking the execution behavior of the various activities as executed by the users. Based on this tracked audit trail records the WFMS automatically derives an improved version of the process model. This improved process model is then used within the next sampling period to derive once more an improved process model. The suggested approach will then be iterated over and over again to steadily improve and finally discover the actual process model.

Thus the present invention teaches the following aspects:

A methodology using a current process model which determines a next process model evolutionary improved and adapted to the business process.

A methodology to determine an initial version of the current process model.

A methodology of iteratively repeating above determination step exploiting the adapted process model and use it as current process model to automatically generate once more a next process model.

While current methodologies of defining process models are a priori in nature, i.e. it is assumed that the correct process model of a business process to be supported must be specified before workflow technology can be used to execute and control the underlying activities making up the business process.

The present invention dramatically simplifies and automates the process of modeling a business model of a business process. The present invention allows to start just with the set of unrelated activities and discover the real world relations between them at a later point in time; data mining and OLAP technologies are exploited for this discovery. The present invention thus proposes a posteriori methodology. For that purpose the precise underlying process model is derived at a later point in time based on audit data collected by the WFMS during the early deployment of a process model.

The proposed methodology assumes that all activities of the process model to be derived are defined to the WFMS. For this purpose all programs available to support the various activities must be catalogued in the WFMS, and all personnel data relevant for the business process must be defined. Basically, an activity definition then is represented by a pair consisting of a program name and a query on the personnel data: The query is used to describe all persons having the duty or responsibility or skill to perform the associated activity, and the program specifies the executable supporting the performance of the activity on a computer. When the WFMS detects that a given activity must be performed it executes the associated query and all people qualifying under that query will get a corresponding notification (called a workitem). The associated program will be started when a person decides to perform the activity.

The proposed methodology of evolutionary discovering the model of a business process begins with simply enumerating all activities encompassed by this business process. This enumeration of activities is the first iteration of the model of the particular business process, i.e. the model is assumed to be the set of isolated activities ("discrete process model"). The model is then set into production, i.e. it can be instantiated as a workflow in the WFMS. The operational behavior of the WFMS is that it will schedule all activities having no predecessor when a process model is instantiated, i.e. the work items corresponding to these activities will be created.

Figure 1:
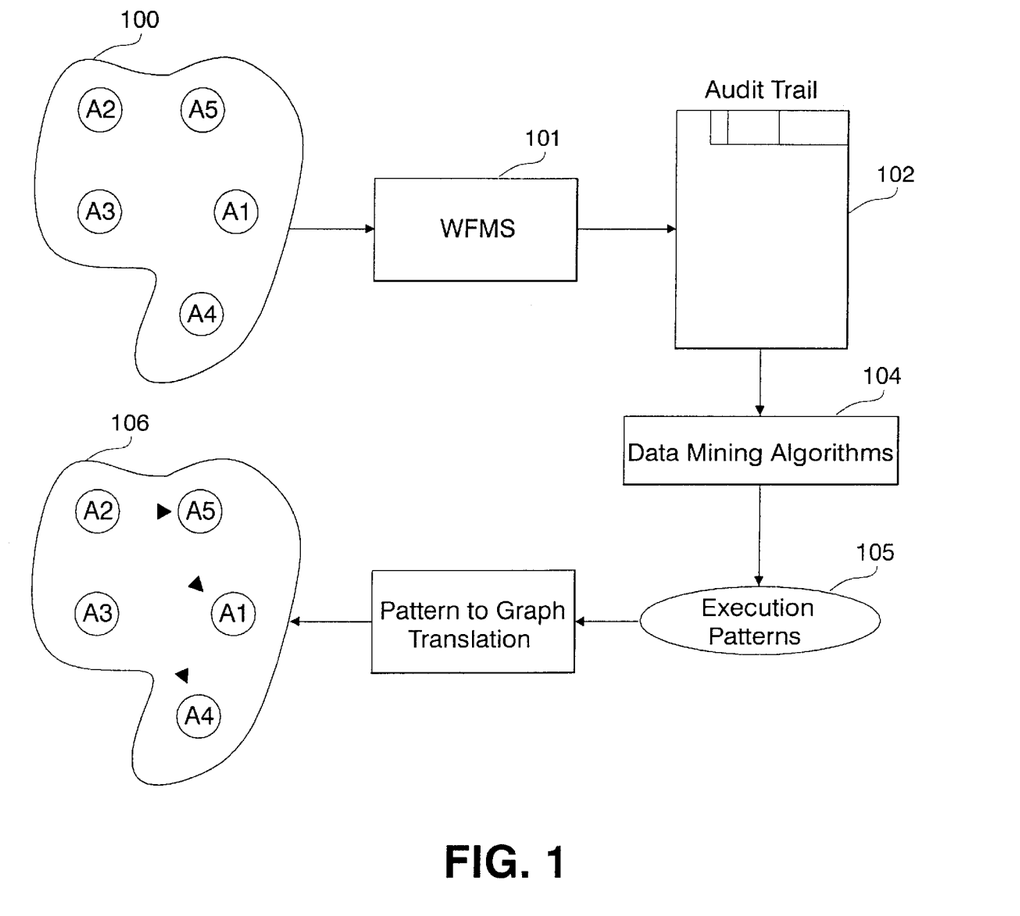
FIG. 1 reflects one iteration step of the present invention starting with the initial process model to derive a first and improved next process model.

FIG. 1 is reflecting one iteration step of the current invention starting with the initial process model to derive a first and improved next process model. The initial process model 100 encompasses activities A1 to A5 at this point in time not prescribing any sequence for their execution. The WFMS 101 is recording the execution pattern by writing audit trail records to the audit trail 103.

Thus, when a process model is instantiated all affected users will get all work items corresponding to all encompassed activities. Due to their local and peculiar knowledge of the underlying business process the users will perform the work items in the appropriate sequence. This sequence is recorded automatically during execution and is reflected in the WFMS's audit trail.

After an appropriate sampling period of time the audit trail will contain the execution sequences of many different instances of the business process. This data will now be analyzed by data mining algorithms and OLAP tools so that a set of execution patterns will result. The patterns with the appropriate confidence and support will be transformed into precedence relations between the activities of the process model: The next iteration of the process model is created. The former iteration is withdrawn from production while the new process model is put into production. Again, the audit trail is analyzed after an appropriate time period to possibly adapt the current process model etc.

FIG. 1 describes the basic approach of the proposed methodology. Data mining algorithms 104 are analyzing the audit trial 102 for execution pattern 105 to finally automatically generate a next process model 106. The next process model will then be used as the current process model to repeat the methodology again for further improvement.

Figure 2:
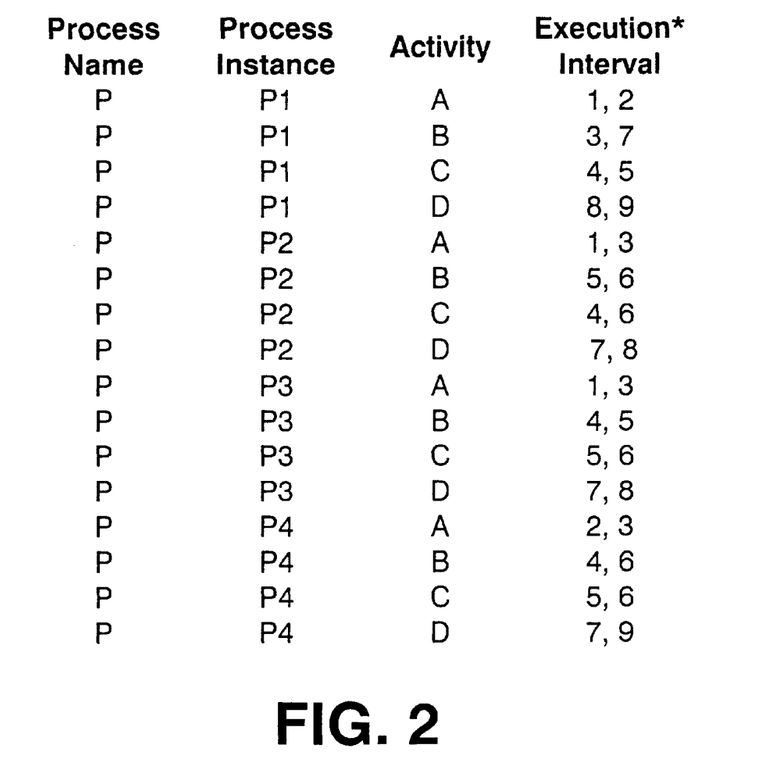
FIG. 2 visualizes a simple example of an audit trail encompassing a multitude of audit trail records.

FIG. 2 visualizes a simple example of an audit trail encompassing a multitude of audit trail records. This example assumes that a business process deals with activities A, B, C, D. Then the first iteration of the corresponding process model is P={A,B,C,D}. The { }- notation indicates a set of activities without any precedence relation within the set of activities; activities belonging to the same { }- set may be executed in parallel. Setting P into production may result in the audit trail of FIG. 2 generated by the WFMS. For simplicity reasons it is further assumed that only one process model (the process model P) is executed. Thus the 'Process Name' column indicates the execution of this process model P. The column 'Process Instance' reflects an indication of the process model instance within which the activity identified by the entry in the 'Activity' column is executed. Finally the column 'Execution Interval' contains the execution interval comprising the starting time and termination time of a particular activity execution.

Figure 3:
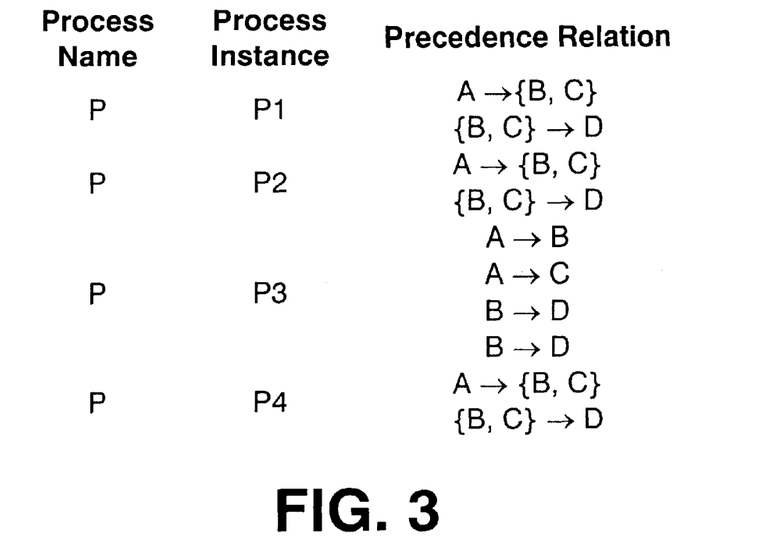
FIG. 3 depicts the precedence relations derived from the audit trail records visualized in the example of FIG. 2.

Exploiting OLAP tools on the audit trail records of the process model of interest the following aggregation of precedence relations as reflected in FIG. 3 can be derived. For each process instance of a certain process model and for each activity the first time an activity has been executed and the last time it has been terminated is derived and the corresponding execution interval is build. Only these records are of interest for the further proceeding. Next, for each instance it is checked which execution intervals intersect: Intersecting intervals mean parallel executions of the associated activities. For all execution intervals of a particular instance which do not intersect the sequence of execution intervals determines the precedence relation of the associated activities; i.e. the sequence of their execution intervals determine in which sequence the activities have to be executed. Combining these individual sequences to the global view results in the desired next process model.

On the aggregation table of FIG. 2 data mining technology is applied to determine the patterns of the precedence relations. The resulting precedence relations are reflected in FIG. 3. Again the { }- notation is used.

Figure 4:
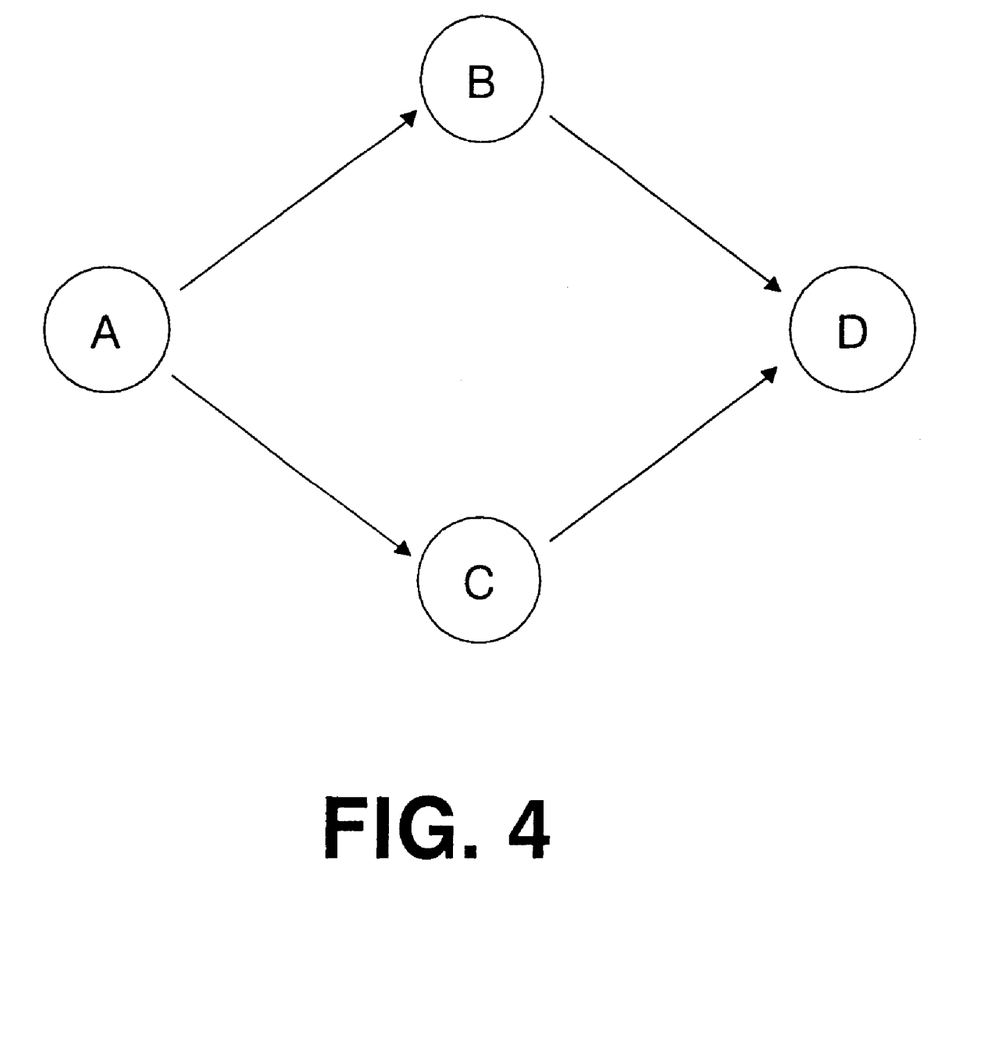
FIG. 4 visualizes the resulting process model of the current example if the individual precedence relations are combined to form the global picture.

If these patterns are then transformed as described above into a global picture the process model results. For the current example the corresponding process model is visualized in FIG. 4.

A further subtlety for the proposed methodology has to be mentioned: A single record in the aggregation table above which indicates parallel execution of activities should overrule all other rows representing sequential execution of the activities. Either this must be determined after the mining algorithms have been applied or the algorithms have to respect this.

In summary, the present invention consists of the following parts:
it exploits data mining technology to detect execution patterns of activities based on audit trail data;
it transform the discovered execution patterns into precedence relations between the affected activities;
it uses a workflow management system to get the audit trail required for input of the data mining algorithms;
it discovers process models in an evolutionary manner start with the isolated set of activities of the subject business process.

As the fundamental advantage process models can be determined in an evolutionary manner. No extensive modelling phase has to be performed before exploiting workflow technology. Moreover the resulting process models might have a higher quality than those derived via interviews with people having only local knowledge about the business process. While up to the current point in time process models have to be defined explicitly the current methodology opens the possibility to determine the process model automatically by the WFMS itself not requiring an extensive modeling phase.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A computerized method of automatically adapting a process-model of a business-process,
   said process-model comprising a multitude of activities being part of said business-process;
   said process-model defining all possible allowed sequences of activities of said business-process;
   said method of adapting comprising
      a pattern-collection-step, wherein said pattern-collection-step is based on a current-process-mode, and during said pattern-collection-step each activity being executed is recorded with an audit-trail by audit-trail-records,
         said audit-trail-records encompassing a process-model-instance-identification of a process-model-instance within said activity being executed;
         said audit-trail-records encompassing an activity-identification of said activity being executed; and
         said audit-trail-records encompassing an execution-interval of said activity being executed comprising a starting-time and a termination-time of said activity being executed;
   said method of adapting further comprising
      a pattern-analysis-step analyzing, after a predefined sampling period, said audit-trail-records and generating a next-process-model
         by determining, in a first step based on the current-process-model from the audit-trail-records with identical process-model-instance-identifications, activities, which are processed sequentially being recorded with non-overlapping execution-intervals, and activities, which are in processed in parallel being recorded with overlapping execution-intervals; and by adapting in a second step said current-process-model to generate a next-process-model by re-ordering those activities, allowed to be processed in parallel according to the current-process-model but actually having been executed sequentially only, as determined in said first step, into sequential execution order based on the time order of said execution-intervals.

2. A computerized method automatically adapting a process-model according to claim 1 being characterized by repeated application of said method of adapting in using said next-process-model as said current-process-model.

3. A computerized method automatically adapting a process-model according to claim 1 wherein said pattern-analysis-step never re-orders two activities in a sequential execution order if said two activities have been determined at least once as being processed in parallel.

4. A computerized method automatically adapting a process-model according to claim 1 wherein said current-process-model and said next-process-model are managed and executed by a Workflow-Management-System (WFMS).

5. A computerized method automatically adapting a process-model according to claim 4 wherein said pattern-collection-step is executed by said WFMS.

6. A computerized method automatically adapting a process-model according to claim 2 wherein said repeated application starts with an initialcurrent-process-model which allows for parallel execution of all activities within said initialcurrent-process-model.

7. A computerized method automatically adapting a process-model according to claim 3 wherein said repeated application starts with an initialcurrent-process-model which allows for parallel execution of all activities within said initial-current-process-model.

8. A computerized method automatically adapting a process-model according to claim 4 wherein said repeated application starts with an initial-current-process-model which allows for parallel execution of all activities within said initial-current-process-model.

* * * * *